United States Patent [19]
Seville

[11] 3,847,420
[45] Nov. 12, 1974

[54] INDUSTRIAL TECHNIQUE
[75] Inventor: Ovid Kingsley Seville, Yardley, Pa.
[73] Assignee: Weston Instruments, Inc., Newark, N.J.
[22] Filed: June 14, 1971
[21] Appl. No.: 152,825

Related U.S. Application Data
[63] Continuation-in-part of Ser. No. 10,168, Feb. 10, 1970, abandoned.

[52] U.S. Cl. .............................. 285/336, 285/350
[51] Int. Cl. ............................................ F16l 17/00
[58] Field of Search ......... 287/119, 20.3, 127, 12 E; 285/382, 382.7, 350, 294, 297, 340, 336; 29/526, 525; 151/14.5, 14 DW; 85/15 P

[56] References Cited
UNITED STATES PATENTS

| | | | |
|---|---|---|---|
| 1,715,854 | 6/1929 | Mortyn | 285/336 X |
| 2,182,995 | 12/1939 | Pepper et al. | 285/336 X |
| 2,331,474 | 10/1943 | Jonoska | 287/119 R |
| 2,429,778 | 10/1947 | Stancliff | 29/526 |

FOREIGN PATENTS OR APPLICATIONS

| | | | |
|---|---|---|---|
| 454,048 | 4/1913 | France | 285/336 |
| 828,003 | 2/1960 | Great Britain | 151/14 DW |

*Primary Examiner*—Dave W. Arola
*Attorney, Agent, or Firm*—William R. Sherman; Stewart F. Moore

[57] ABSTRACT

A typical embodiment of the invention discloses a technique for joining structures. For instance, to provide a heat-resistant vacuum seal in a photomultiplier tube, a mechanically deformable material is interposed between tube components. The deformable material is seated in complementary grooves formed in opposing component surfaces. The components then are compressed together with sufficient force to exceed the elastic limit of the interposed material in order to distort the material and enable it to flow plastically into the grooves and thereby lock the components together.

4 Claims, 5 Drawing Figures

PATENTED NOV 12 1974

INDUSTRIAL TECHNIQUE

This is a continuation in part of copending U.S. Pat. application Ser. No. 10,168, filed Feb. 10, 1970.

BACKGROUND OF THE INVENTION

1. Field of the Invention

This invention relates to joining techniques and more specifically, to a technique for producing a heat-resistant vacuum seal for connecting photomultiplier tube components, and the like, which can be accomplished without the introduction of heat in the seal area.

2. Summary of the Prior Art

Ordinarily, vacuum seals are provided for structures through welding, soldering or brazing techniques that establish bonds between the structural components that are to be joined together. These techniques, however, frequently raise production difficulties. For instance, a seal often must be established in close proximity to some other glass to metal seal, braze, a heat sensitive photocathode, or material, which can be damaged by thermal stresses introduced through normal welding, soldering or brazing technique. It may also be desirable to heat a structrue after brazing. The ideal heat treatment temperature occasionally is higher than the melting point of the brazing compound. Clearly, in a situation of this sort, a less than optimum heat treatment temperature must be accepted.

Chemical compatibility between the joined structure and the brazing material frequently introduces another source of production difficulty. For instance, in the manufacture of photoelectric devices the possibility of a destructive chemical activity between portions of a photomultiplier tube envelope and the light-responsive electron emitter, or photocathode, often is avoided through a resort to complicated production techniques. Alternatively, an unsatisfactory compromise must be accepted between the qualities desired in a tube and those tube characteristics that are usually attainable with chemically nonreactive materials.

SUMMARY

In accordance with the invention, a plastically deformable substance is interposed between complementary grooves formed in the structural components that are to be joined together. These grooves or recesses act as an extrusion die for the interposed material. Typically, as the components to be joined are pressed together, the interposed material is forced to flow into the recesses and assume a shape imposed on the material by the groove configuration. Preferably, the recesses have reentrant angles, serrations or notches that engage the deformed material and lock the components together.

More particularly, an illustrative embodiment of the invention has two cylindrical components or members arranged in telescoping relation. Recesses are formed in mutually opposing surfaces of each of the members and are so positioned relative to each other that they will both share a common transverse plane when the members are fully telescoped together. These recesses moreover, should establish the aforementioned reentrant angles relative to the transverse plane.

Copper, tin, brass, zinc and magnesium are typical of the plastically deformable materials that can be interposed in an annular ring between the two grooves. The main property of the material for the purpose of the invention, being the ability ot appear to follow the laws of hydrodynamics and flow into the recesses in response to the forces established during the telescopic movement of the two members relative to each other. The notches formed by the reentrant angles engage the plastically deformed material and tend to lock the two members together, thereby preventing these members from disengaging themselves from the now deformed ring. A seal thus formed between the two telescoped members permanently locks these members in a gas or fluid-tight seal that can be subjected to high temperatures during subsequent processing or manufacturing steps. The invention, moreover, is subject to substantial modification. For example, the deformable material could comprise a suitably shaped portion of one of the telescopically engaged members.

For a better understanding of the present invention together with other and further objects thereof, reference is had to the following description taken in connection with the accompanying drawing, the scope of the invention being pointed out in the appended claims.

BRIEF DESCRIPTION OF THE PREFERRED EMBODIMENTS

Figure 1:
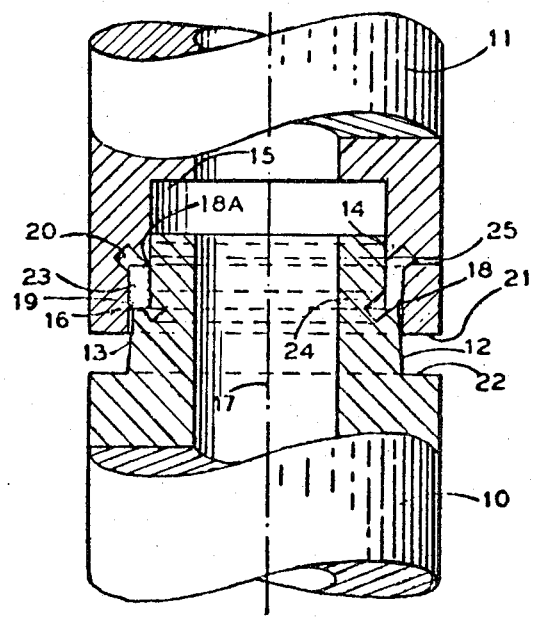
FIG. 1 shows in broken section an exemplary embodiment of the invention before the seal is formed between the members.

For more complete appreciation of the invention, FIG. 1 shows a structural member 10 to be joined to another structural member 11. As shown in this illustrative embodiment, the member 10 has a cylindrical shape with a protruding shoulder portion 12 formed on the end portion adjacent to the member 11 for telescopic engagement and alignment with a matching surface 13 formed in a recessed end portion of the member 11. A further protruding cylindrical shoulder portion 14 of smaller diameter than the shoulder portion 12 is formed and terminates the extreme end of the member 10. The shoulder portion 14 also aligns itself in telescopic engagement with a corresponding surface 15 formed in the innermost recessed portion of the member 11. The surface 13 has, of course, a larger diameter than the surface 15. The length of the shoulder portion 12 should protrude longitudinally a distance that is equal to or more than the length of the adjacent surface 13. In contrast, the length of the shoulder portion 14 should be equal to or less than the length in a longitudinal direction of the recessed surface 15.

A groove 16 is formed in the member 10 at the base of the shoulder portion 14. The groove 16 has a rectangular shape in which the parallel sides that establish the width of the groove also form an acute angle with longitudinal axis 17 of the two members 10 and 11. The groove 16 terminates in a beveled or chamfered edge 18 that slightly tapers the shoulder portion 12. Preferably, a taper angle of about 5° relative to the longitudinal axis 17 is suitable for the practice of the invention. The chamfered edge 18 and the groove 16 combine to produce a reentrant angle, a serration or notch 19 to be described subsequently in more complete detail. The void formed by the tapered shoulder portion 12 and the adjacent surface 13 also provides an overflow volume to receive excess seal material and relieves stresses during seal formation.

A complementary annular groove 20 is formed in the member 11 at the circumferential termination of the interior surface 15. A rectangular configuration also is preferred for the groove 20. The parallel sides of the groove also establish an acute angle with the longitudinal axis 17 of the members 10 and 11. One of the walls of the groove 20, moreover, terminates at the surface 15 to form a sharp serration 18A.

To produce a seal in accordance with the invention, an annular ring 23 formed from a relatively soft, deformable metal that preferably has a higher melting point than that which characterizes any subsequent heat treatment temperatures, is interposed between the members 10 and 11 and is seated in the grooves 16 and 20. As shown in FIG. 1, the inner diameter of the deformable ring 23 is equal to the diameter of the shoulder portion 14. The outer ring diameter is equal to the inner diameter of the cylindrical surface 13. The member 11 is telescoped over the end of the member 10 until the serrations 18A and 19 engage the ring 23.

Figure 2:
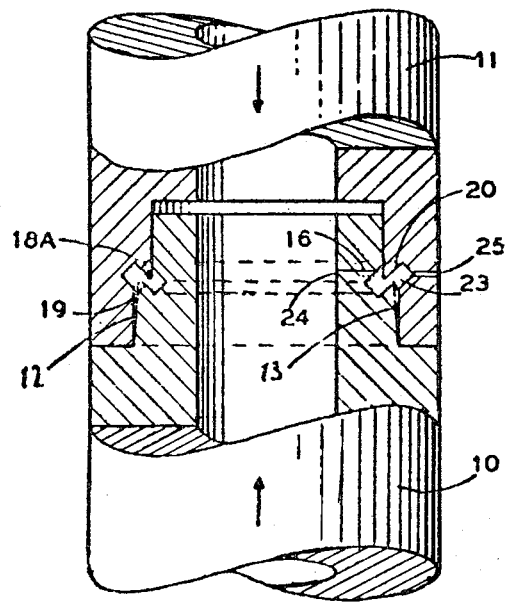
FIG. 2 shows in broken section a completed seal in which the members illustrated in FIG. 1 are fully engaged.

Turning now to FIG. 2, in order to complete the manufacture of a seal or bond in accordance with the invention, the two members 10 and 11 are telescoped together through relative movement toward each other in the direction of the arrows along the longitudinal axis 17. As shown in the drawing, the volume of deformable metal in the ring 23 is about equal to the combined volume of the grooves 16 and 20 when the two members are fully telescoped together. Overflow metal is accommodated in the void formed between the tapered shoulder portion 12 and the surface 13. The grooves 16 and 20, moreover, act as an extrusion die and, under the forces produced through the telescoping motion, cause the ring 23 to flow plastically, subject largely to the laws of hydrodynamics, and assume a shape that corresponds to the configuration established by the grooves 16 and 20. These two grooves, when the members 10 and 11 are fully telescoped together, are such that they share a common plane transverse to the cylindrical axis 17. The serrations 18A and 19 bite into and form reentrant angles or notches in the deformed ring 23 that grip the ring and prevent the members 10 and 11 from being pulled apart.

The material from which the grooves 16 and 20 are formed must have a greater hardness than the material from which the ring 23 is formed in order to cause the ring to deform and flow. Additional reinforcement during the telescoping step could be provided through internal and external bands (not shown) to brace the members 10 and 11, respectively.

A bore 24 is formed in the member 10 to provide fluid communication between the groove 16 and the atmosphere. Similarly, a bore 25 also is formed in the member 11 to provide fluid communication between the groove 20 and the atmosphere exterior to the surface of the member 11. This will prevent production difficulties from arising due to air or other fluids that might be trapped between the confines of the respective grooves and the flowing ring 23 during the telescoping movement. After assembly, the bores 24 and 25 are preferably blocked or plugged by metal from the deformed ring 23, by welding, or through some other suitable technique. Bores 24 and 25 may be omitted when seal is accomplished in a vacuum environment.

Figure 3:
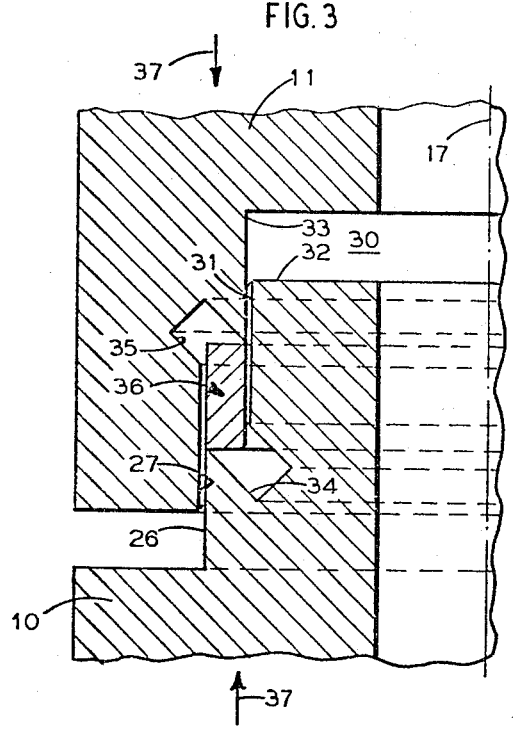
FIG. 3 is another exemplary embodiment of the invention before the seal is formed between the members.

FIG. 3 illustrates a further principle of the invention. As shown, the members 10 and 11 have cylindrical shapes and are provided with a shoulder portion 26 formed on the end portion of the member 10 that is adjacent to the member 11 for telescopic engagement and alignment with a matching surface 27 formed in a recessed end 30 of the member 11. A further protruding cylindrical shoulder portion 31 is formed and terminates an extreme end 32 of the member 10. The shoulder 31 also aligns itself in telescopic engagement with a corresponding surface 33 formed in the innermost recessed portion of the member 11. The surface 27 has, of course, a larger diameter than the surface 33.

An annular groove 34 is formed in the member 10 at the base of the shoulder 31. The groove 34, as shown in FIG. 3, has a rectangular shape, the parallel sides of which form acute angles with the longitudinal axis 17 of the members 10 and 11. Annular groove 35 is vertically spaced from the groove 34 and is formed in the member 11 at the transition between the larger diameter recessed matching surface 27 and the relatively smaller diameter surface 33. The angular orientation relative to the longitudinal axis 17 and physical dimensions of the groove 35 are similar to those of the groove 34.

Figure 4:
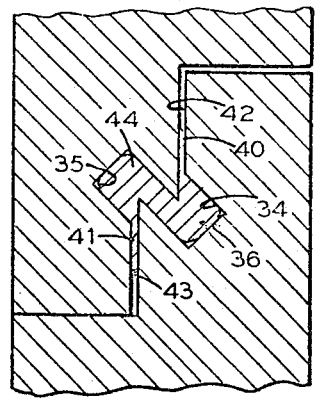
FIG. 4 shows a completed seal in which the members illustrated in FIG. 3 are fully engaged.

A ring or annulus 36 of material that can be extruded by the surface of the grooves 34 and 35 is engaged between the bights of these grooves. The sum of the volume of the individual annular grooves 34 and 35 is somewhat less than the volume of the ring 36 when the seal is formed as shown in FIG. 4.

Thus, as illustrated, the members 10 and 11 are forced together in the directions shown by arrows 37 into telescopic engagement. Thus vertical translation is so proportioned that the area in the plane of the drawing of the canted zee formed by the two grooves 34 and 35 is less than the area of the interposed annulus or ring 36 in the same plane. Consequently, the volume of the annulus formed by the two grooves is less than the volume of the material that forms the ring 36 which is engaged by the grooves. As the ring 36 flows into the grooves under the applied forces, excess material 40 and 41, that is equal to the difference between the volume of the ring and the volume of the canted zee annulus, is extruded into communicating hollow cylindrical clearances 42 and 43 that are formed between the shoulder 31 and the surface 33 and the shoulder 26 and the matching surface 27, respectively. In this way there is an assurance that the entire zee is filled with ring material and the two members 10 and 11 are wedged tightly together in order to reduce the possibility of a loose fit or relative movement between the sealed parts.

It also should be noted that the proportioned vertical translation of the member 10 and 11, while establishing the volume relationship described above also should maintain a shank portion 44 that is sufficiently thick to preserve the structural integrity of the sealed members 10 and 11. A shank portion 44 that is too thin may fail to hold the sealed members 10 and 11 together in ordinary use. Thus, the specific thickness of the shank portion is subject to conventional design considerations based on the shear and tension stresses that are to be applied to the members 10 and 11.

Figure 5:
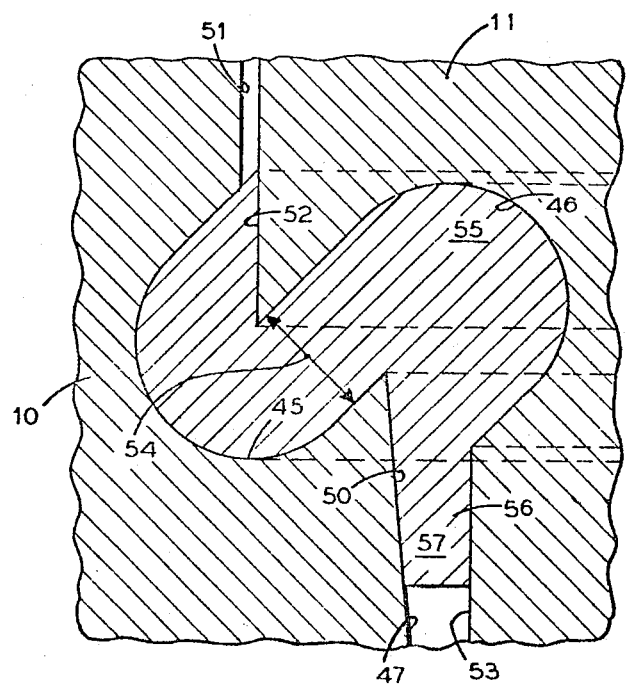
FIG. 5. illustrates still another exemplary embodiment of the invention.

A further embodiment of the invention is shown in FIG. 5. As illustrated, the sealed members 10 and 11 each are provided with respective annular grooves 45 and 46. The groove 45 is formed generally at the transition between a lower protruding shoulder portion 47, that has a slightly tapered section 50 immediately below the groove 45, and an upper recessed shoulder portion 51. Conversely, the groove 46 is formed at the transition between an upper protruding shoulder portion 52, and a lower recessed shoulder portion 53. The sides of the grooves 45 and 46 form acute or obtuse angles with the respective portions generally as shown in FIG. 5. The groove bottoms, however, are of a semicircular configuration, the radius of curvature in the illustrated embodiment being equal to twice the width of a shank portion 54 that is formed between the protruding sides of the opposing grooves 45 and 46.

A ring or annulus 55 of material that is deformable under the applied forces, e.g., aluminum, flows into and fills the grooves 45 and 46 in the manner described in connection with the embodiments of the invention shown in FIGS. 1 through 4, inclusive. Because the volume of the ring 55 is greater than the combined volume of the grooves 45 and 46, excess material 57 is extruded from the grooves into a small clearance 56 that is formed between the lower recessed shoulder 53 and the tapered section 50 that was provided in the lower protruding shoulder 47.

It has been found that the rounded bottoms of the grooves 45 and 46 tend to promote better metal flow and reduce the opportunity for the undesirable development of air pockets between the groove surfaces and the deformed ring 55.

Alternative techniques also are within the scope of the invention. For instance, as hereinbefore suggested, the deformable ring 23 (FIGS. 1 and 2) can be an integral part of one of the members 10 or 11. The recess formed in the ring engaging member then acting as an extrusion die to cause the integral ring to flow and lock in place as described above. The process is further suitable for use in almost any environment, gas, vacuum, or the like.

I claim:

1. A seal comprising a pair of members in telescopic engagement, one of said members having a recess formed therein to receive said other member, said other member having two axially spaced portions formed thereon for sliding engagement with the sides of said recess, said portions being radially separated from each other by a shoulder that defines a common plane, said one member having a generally inwardly opening groove formed at said plane common to said portions and said other member having a generally outwardly opening groove formed therein at said common plane, each of said grooves lying in a plane at an acute angle with the axis of said telescopic engagement, said grooves being axially offset from each other, and a plastically deformable material interposed between said grooves for extrusion into said grooves when said members are telescoped together.

2. A seal according to claim 1 wherein said members further comprise a chamfered portion associated with at least one of said grooves to establish a reentrant angle in said plastically deformable material when said members are telescoped together.

3. A seal comprising first and second substantially cylindrical members engageable in telescoping relationship; penetration limiting means on said members for defining a fully telescoped relationship between said members, said first member having an inwardly facing wall with means defining a generally inwardly facing groove therein, said second member having an outwardly facing wall with means defining a generally outwardly facing groove therein, said limiting means and said grooves being relatively arranged so that said grooves are slightly axially offset from each other in said fully telescoped relationship; said means defining said outwardly facing groove having a portion extending radially outwardly and a portion lying radially inwardly of said means defining said inwardly facing groove to define a radial and an axial clearance between said grooves; ring means deformable by said members as said members approach said fully telescoped relationship for occupying said grooves and at least a portion of said clearance, said ring means having an initial undeformed volume greater than the total volume of said grooves.

4. A seal according to claim 3 wherein said inwardly and outwardly facing grooves also face axially toward each other.

* * * * *